US012779869B2

(12) United States Patent
Kawajiri et al.

(10) Patent No.: US 12,779,869 B2
(45) Date of Patent: Nov. 3, 2026

(54) 3D PRINTER

(71) Applicant: FUJI CORPORATION, Chiryu (JP)

(72) Inventors: Akihiro Kawajiri, Chiryu (JP); Shunji Morikawa, Toyoake (JP); Sayaka Hirose, Tougou-cho (JP)

(73) Assignee: FUJI CORPORATION, Chiryu (JP)

( * ) Notice: Subject to any disclaimer, the term of this patent is extended or adjusted under 35 U.S.C. 154(b) by 203 days.

(21) Appl. No.: 18/712,381

(22) PCT Filed: Dec. 15, 2021

(86) PCT No.: PCT/JP2021/046274
§ 371 (c)(1),
(2) Date: May 22, 2024

(87) PCT Pub. No.: WO2023/112204
PCT Pub. Date: Jun. 22, 2023

(65) Prior Publication Data

US 2025/0010629 A1 Jan. 9, 2025

(51) Int. Cl.
*B41J 2/175* (2006.01)

(52) U.S. Cl.
CPC ........... *B41J 2/17596* (2013.01); *B41J 2/175* (2013.01); *B41J 2202/04* (2013.01)

(58) Field of Classification Search
CPC ........... B41J 2/17596; B41J 2/175; B41J 2/19
See application file for complete search history.

(56) References Cited

U.S. PATENT DOCUMENTS

2011/0134171 A1* 6/2011 Leighton .............. B41J 2/17556 347/17
2016/0089897 A1 3/2016 Nishiyama
2018/0022020 A1* 1/2018 Kawabata ................ B41J 2/175 210/361
2018/0134033 A1* 5/2018 Sawase .................... B41J 29/38
2019/0016056 A1* 1/2019 Tsukahara .............. B33Y 30/00
2020/0338901 A1* 10/2020 Meyer .................. B41J 2/17556

FOREIGN PATENT DOCUMENTS

JP 2015-112796 A 6/2015
JP 2017-170637 A 9/2017
JP 2021-84326 A 6/2021
JP 2021-84402 A 6/2021

OTHER PUBLICATIONS

International Search Report Issued Mar. 8, 2022, in PCT/JP2021/046274, filed on Dec. 15, 2021, 2 pages.

* cited by examiner

*Primary Examiner* — Ariella Machness
(74) *Attorney, Agent, or Firm* — Oblon, McClelland, Maier & Neustadt, L.L.P.

(57) ABSTRACT

As described above, three-dimensional printer 10 includes inkjet head 200 configured to eject ink, head tank 210 configured to store the ink to be supplied to inkjet head 200, ink tank 220 configured to store the ink to be supplied into head tank 210, pipe 230 that connects head tank 210 and ink tank 220, vacuum pump 242 configured to generate a high negative pressure, first pressure line 271 that connects head tank 210 and vacuum pump 242, and controller 110 configured to, when supplying the ink from ink tank 220 into head tank 210 via pipe 230, cause the high negative pressure generated by vacuum pump 242 to be applied to head tank 210 via first pressure line 271.

5 Claims, 8 Drawing Sheets

3D PRINTER

TECHNICAL FIELD

The present disclosure relates to a technique for performing three-dimensional printing by ejecting ink from an ejection head that ejects ink.

BACKGROUND ART

Patent Literature 1 discloses a method of exchanging an ink cartridge including an ejection head that ejects ink, in which the ejection head is provided with two ink flow paths to which ink cartridges that store ink to be supplied into the ejection head are detachably connected, and when at least one of the ink cartridges becomes empty and is exchanged with a new ink cartridge, the ink cartridge is configured to be exchanged without introducing air bubbles into the ejection head.

FIG. 8 illustrates a configuration around a conventional ejection head where, unlike the ejection head described in Patent Literature 1, the supply of ink to inkjet head 200, which is an ejection head, is performed by head tank 510 that is not detachable from inkjet head 200. In the illustrated configuration, ink is supplied to head tank 510 from external ink tank 220 by pump 520.

PATENT LITERATURE

Patent Literature 1: JP-A-2017-170637

BRIEF SUMMARY

Technical Problem

However, in the configuration illustrated in FIG. 8, since ink is supplied from ink tank 220 to head tank 510 using dedicated pump 520, when ink is supplied using an essential configuration provided for other functions, dedicated pump 520 is not required, thereby reducing the manufacturing cost of the entire device.

An object of the present disclosure is to provide a technique capable of reducing the manufacturing cost of the entire device by eliminating the need for a dedicated pump for supplying ink from an ink tank to a head tank.

Solution to Problem

According to an aspect of the present disclosure, a three-dimensional printer includes: an ejection head configured to eject ink; a head tank configured to store the ink to be supplied to the ejection head; an ink tank configured to store the ink to be supplied into the head tank; a pipe that connects the head tank and the ink tank; a negative pressure generating device configured to generate a negative pressure; a first pressure line that connects the head tank and the negative pressure generating device; and a control section configured to, when supplying the ink from the ink tank into the head tank via the pipe, cause the negative pressure generated by the negative pressure generating device to be applied to the head tank via the first pressure line.

Advantageous Effects

With the present disclosure, it is possible to reduce the manufacturing cost of the entire device by eliminating the need for a dedicated pump for supplying ink from an ink tank to a head tank.

DESCRIPTION OF EMBODIMENTS

An embodiment of the present disclosure will be described in detail below based on the accompanying drawings.

Figure 1:
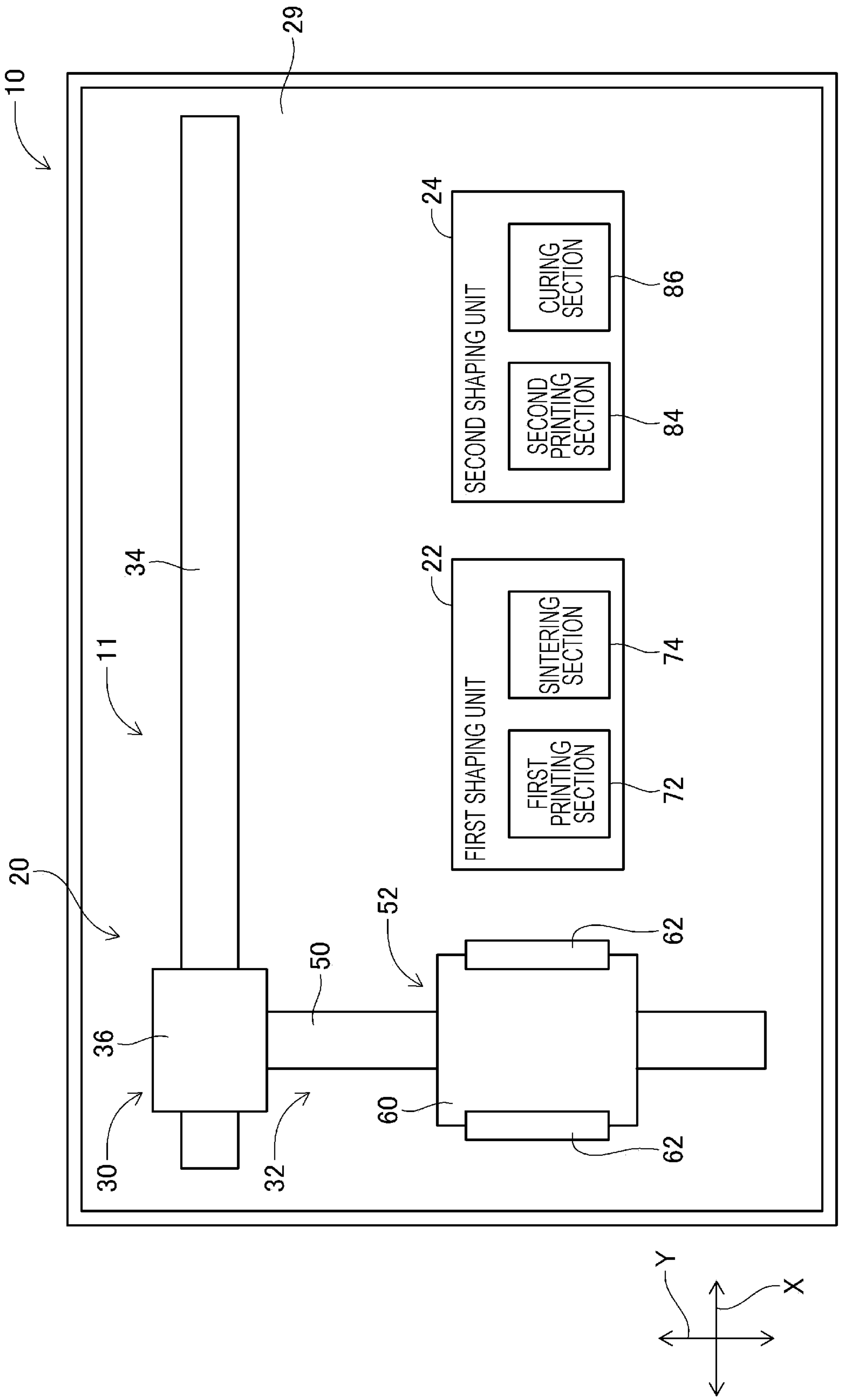
FIG. 1 is a view illustrating a schematic configuration of a three-dimensional printer according to an embodiment of the present disclosure.
Figure 2:
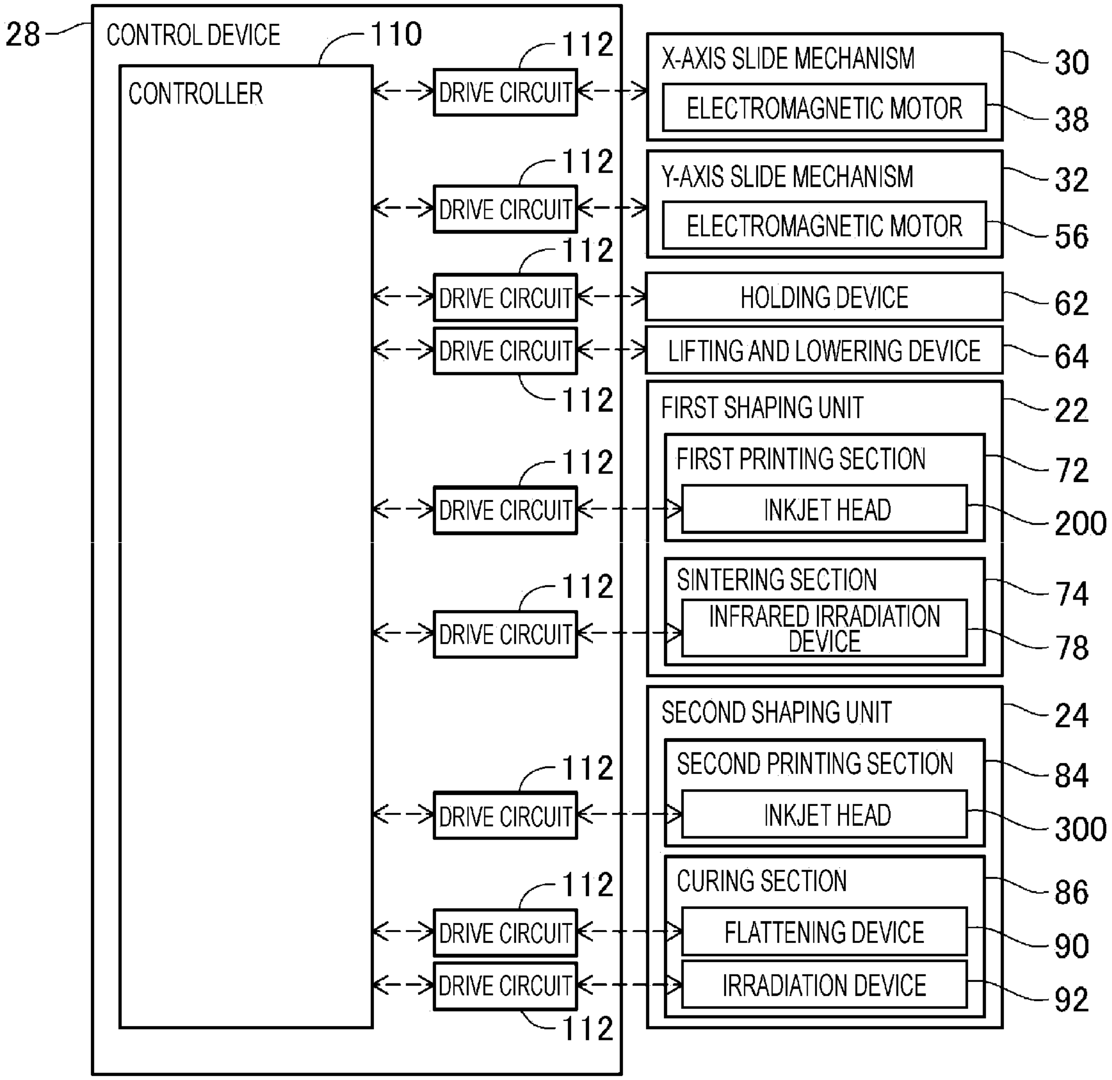
FIG. 2 is a block diagram illustrating a control device of the three-dimensional printer in FIG. 1.

FIG. 1 illustrates a schematic configuration of three-dimensional printer 10 according to an embodiment of the present disclosure. three-dimensional printer 10 is provided with conveyance device 20, first shaping unit 22, second shaping unit 24, and control device 28 (refer to FIG. 2). Conveyance device 20, first shaping unit 22, and second shaping unit 24 are disposed on base 29 of three-dimensional printer 10. Base 29 has a generally rectangular shape, and in the following description, a longer direction of base 29 will be referred to as an X-axis direction, a shorter direction of base 29 will be referred to as a Y-axis direction, and a direction orthogonal to both the X-axis direction and the Y-axis direction will be referred to as a Z-axis direction. The Z-axis direction is the same as the vertical direction.

Conveyance device 20 includes X-axis slide mechanism 30 and Y-axis slide mechanism 32. X-axis slide mechanism 30 includes X-axis slide rail 34 and X-axis slider 36. X-axis slide rail 34 is disposed on base 29 to extend in the X-axis direction. X-axis slider 36 is held by X-axis slide rail 34 to be slidable in the X-axis direction. Furthermore, X-axis slide mechanism 30 includes electromagnetic motor 38 (refer to FIG. 2), and X-axis slider 36 is moved to any position in the X-axis direction by driving electromagnetic motor 38. In addition, Y-axis slide mechanism 32 includes Y-axis slide rail 50 and table 52. Y-axis slide rail 50 is disposed on base 29 to extend in the Y-axis direction and is movable in the X-axis direction. One end portion of Y-axis slide rail 50 is coupled to X-axis slider 36. Table 52 is held on Y-axis slide rail 50 to be slidable in the Y-axis direction. Furthermore, Y-axis slide mechanism 32 includes electromagnetic motor 56 (refer to FIG. 2), and table 52 is moved to any position in the Y-axis direction by driving electromagnetic motor 56. In this manner, table 52 is moved to any position on base 29 by driving X-axis slide mechanism 30 and Y-axis slide mechanism 32.

Table 52 includes base plate 60, holding device 62, and lifting and lowering device 64 (refer to FIG. 2). Base plate 60 is formed in a flat plate shape, and a pallet (not illustrated) is placed on an upper surface thereof. Holding devices 62 are provided on both side portions of base plate 60 in the X-axis direction. Then, both edge portions of the pallet placed on base plate 60 in the X-axis direction are sandwiched by holding devices 62, so that the pallet is fixedly held. In addition, lifting and lowering device 64 is disposed below base plate 60, and lifts and lowers base plate 60.

First shaping unit 22 is a unit that shapes a wiring of a circuit board, and includes first printing section 72 and sintering section 74. First printing section 72 includes inkjet head 200 (refer to FIG. 2), and inkjet head 200 linearly ejects metal ink. The metal ink is ink obtained by dispersing nanometer-sized metal, for example, silver fine particles in a solvent. Surfaces of the metal fine particles are coated with a dispersant and aggregation in the solvent is prevented. In addition, inkjet head 200 ejects the metal ink from multiple nozzles by, for example, a piezo method using a piezoelectric element.

Sintering section 74 includes infrared irradiation device 78 (refer to FIG. 2). Infrared irradiation device 78 is a device for irradiating the ejected metal ink with infrared light, and the metal ink irradiated with infrared light is sintered to form the wiring. Sintering of the metal ink is, for example, a phenomenon in which evaporation of a solvent or decomposition of a protective film of metal fine particles, that is, a dispersant is performed by applying energy, so that conductivity is increased by contacting or fusing the metal fine particles. Then, the metal ink is sintered to form a metal wiring. The metal ink may be abbreviated as ink hereinafter.

In addition, second shaping unit 24 is a unit that shapes a resin layer of a circuit board, and includes second printing section 84 and curing section 86. Second printing section 84 includes inkjet head 300 (refer to FIG. 2), and inkjet head 300 ejects an ultraviolet curable resin. The ultraviolet curable resin is a resin that is cured by irradiation with ultraviolet light. Inkjet head 300 may be, for example, a piezo type inkjet head using a piezoelectric element, or may be a thermal type inkjet head in which a resin is heated to generate air bubbles, which are ejected from multiple nozzles.

Curing section 86 includes flattening device 90 (refer to FIG. 2) and irradiation device 92 (refer to FIG. 2). Flattening device 90 flattens an upper surface of the ultraviolet curable resin ejected by inkjet head 300. For example, while a surface of the ultraviolet curable resin is levelled, an excess resin is scraped out by a roller or a blade. In this manner, a thickness of the ultraviolet curable resin is uniformized. In addition, irradiation device 92 includes a mercury lamp or LED as a light source, and irradiates the ejected ultraviolet curable resin with ultraviolet light. As a result, the ejected ultraviolet curable resin is cured to form a resin layer.

As illustrated in FIG. 2, control device 28 includes controller 110 and multiple drive circuits 112. Multiple drive circuits 112 are connected to electromagnetic motors 38 and 56, holding device 62, lifting and lowering device 64, inkjet head 200, infrared irradiation device 78, inkjet head 300, flattening device 90, and irradiation device 92. Controller 110 includes CPU, ROM, RAM, and the like, is mainly a computer, and is connected to multiple drive circuits 112. As a result, the operations of conveyance device 20, first shaping unit 22, and second shaping unit 24 are controlled by controller 110.

In three-dimensional printer 10, with the above-described configuration, a resin stack is formed on a pallet placed on base plate 60 of table 52, and a wiring is formed on the upper surface of the resin stack and thus a circuit board is formed.

Figure 3:
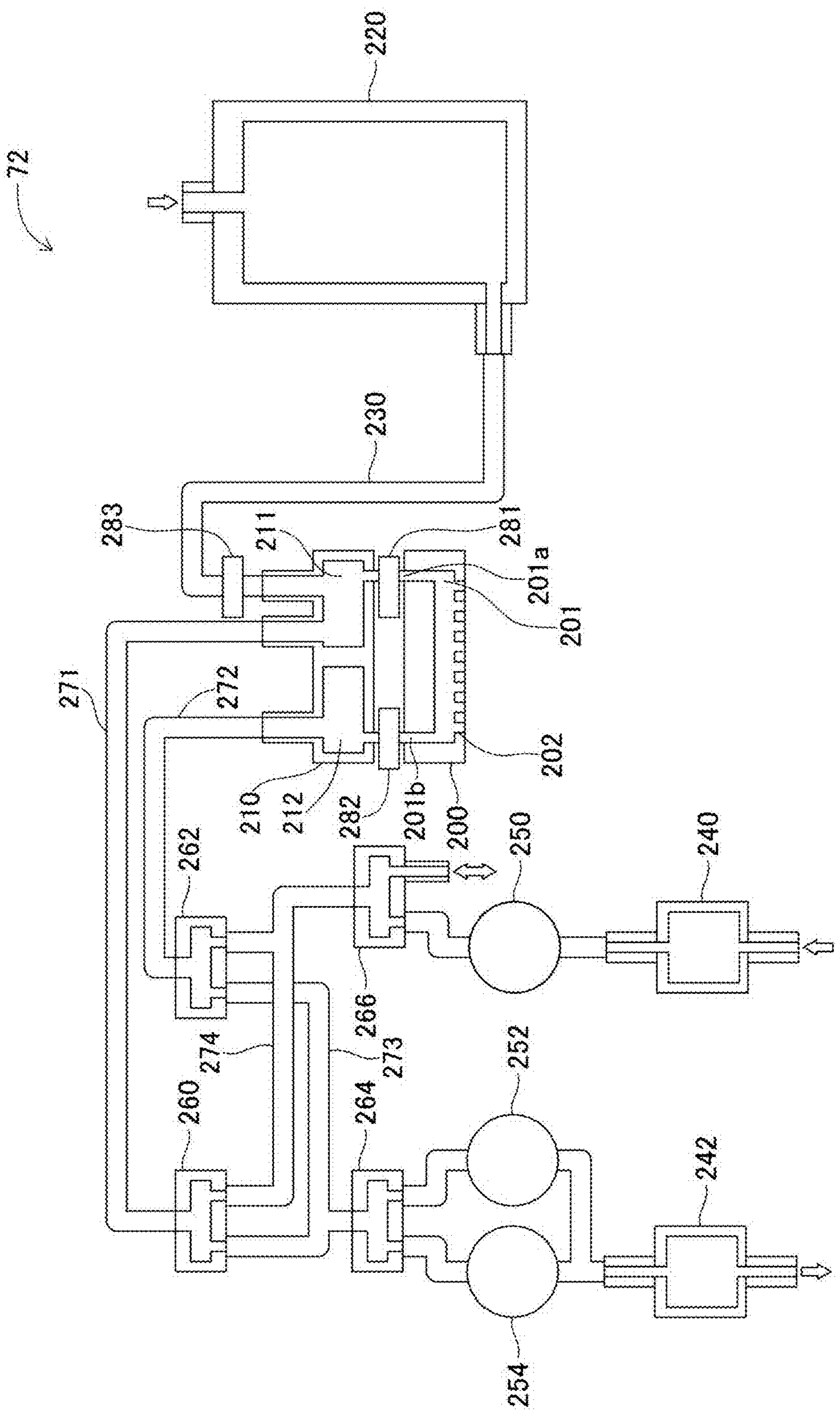
FIG. 3 is a view illustrating a configuration around an inkjet head provided in the three-dimensional printer of FIG. 1.

FIG. 3 illustrates a configuration around inkjet head 200 of first printing section 72. In the configuration of FIG. 3, the same configurations as those in FIG. 8 are denoted by the same reference numerals.

As illustrated in FIG. 3, ink flow path 201 is provided in inkjet head 200. Multiple nozzles 202 for ejecting ink in ink flow path 201 are formed on the bottom surface of ink flow path 201. First and second end portions 201*a* and 201*b* of ink flow path 201 are connected to head tank 210 via first and second opening and closing valves 281 and 282.

Figure 8:
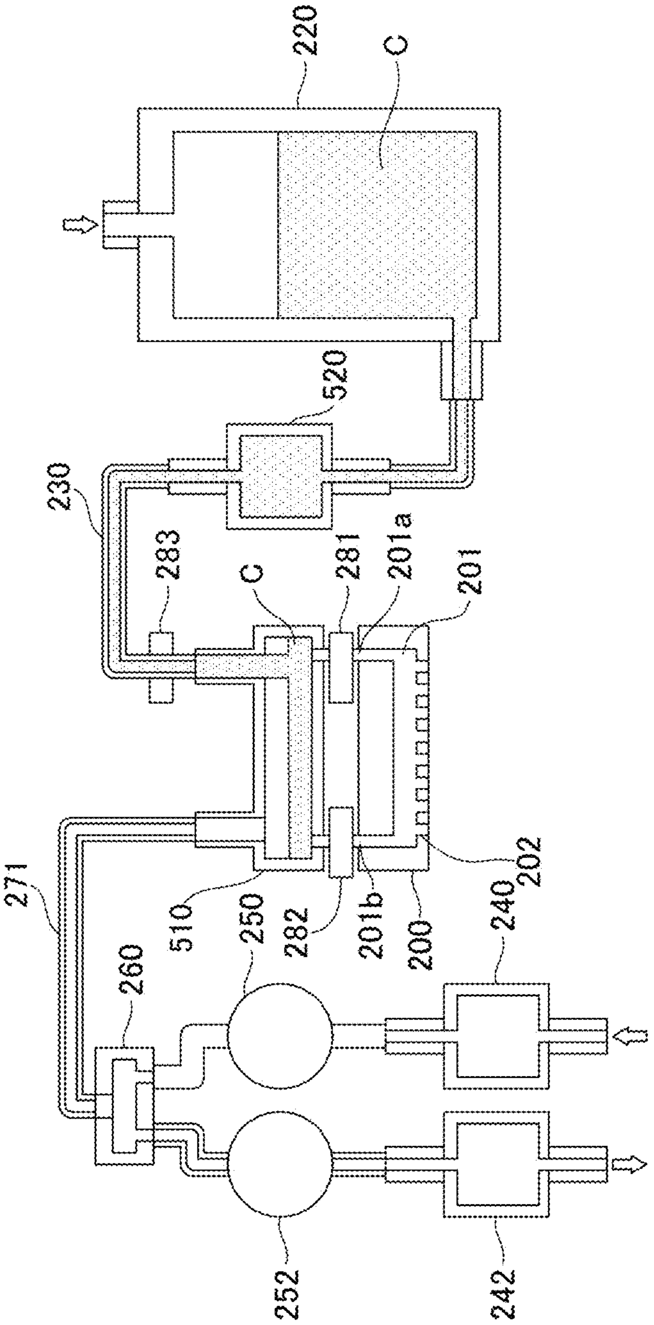
FIG. 8 is a view illustrating a conventional configuration around the ejection head.

Head tank 210, unlike head tank 510 of FIG. 8, is divided into two chambers, first and second chambers 211 and 212 in head tank 210. First chamber 211 is connected to first end portion 201*a* of ink flow path 201 via first opening and closing valve 281, and second chamber 212 is connected to second end portion 201*b* of ink flow path 201 via second opening and closing valve 282. First chamber 211 is connected to ink tank 220 via pipe 230, and third opening and closing valve 283 is provided at an end portion of pipe 230 on first chamber 211 side. Further, first pressure line 271 for applying pressure is connected to first chamber 211. Meanwhile, second pressure line 272 for applying pressure is connected to second chamber 212.

First switching valve 260 that switches the pressure applied to first chamber 211 via first pressure line 271 is connected to the opposite end portion of first chamber 211 of first pressure line 271. On an input side of first switching valve 260, third switching valve 264 is connected via third pressure line 273, and fourth switching valve 266 is connected via fourth pressure line 274. On an input side of third switching valve 264, a high negative pressure generated by vacuum pump 242 and first pressure regulator 254 is input and a low negative pressure generated by vacuum pump 242 and second pressure regulator 252 is input. Further, on an input side of fourth switching valve 266, a positive pressure generated by positive pressure pump 240 and third pressure regulator 250 is input and an atmospheric pressure is input. Accordingly, any one of high negative pressure, low negative pressure, positive pressure, and atmospheric pressure can be applied to first chamber 211 by appropriately controlling the switching of first, third, and fourth switching valves 260, 264, and 266.

Second switching valve 262 that switches the pressure applied to second chamber 212 via second pressure line 272 is connected to the opposite end portion of second chamber 212 of second pressure line 272. Similarly to the input side of first switching valve 260, on an input side of second switching valve 262, third switching valve 264 is connected via third pressure line 273, and fourth switching valve 266 is connected via fourth pressure line 274. Accordingly, any one of high negative pressure, low negative pressure, positive pressure, and atmospheric pressure can be applied to second chamber 212 by appropriately controlling the switching of second to fourth switching valves 262, 264, and 266.

The control process executed by three-dimensional printer 10 configured as described above will be described in detail with reference to FIGS. 4 to 7.

Figure 4:
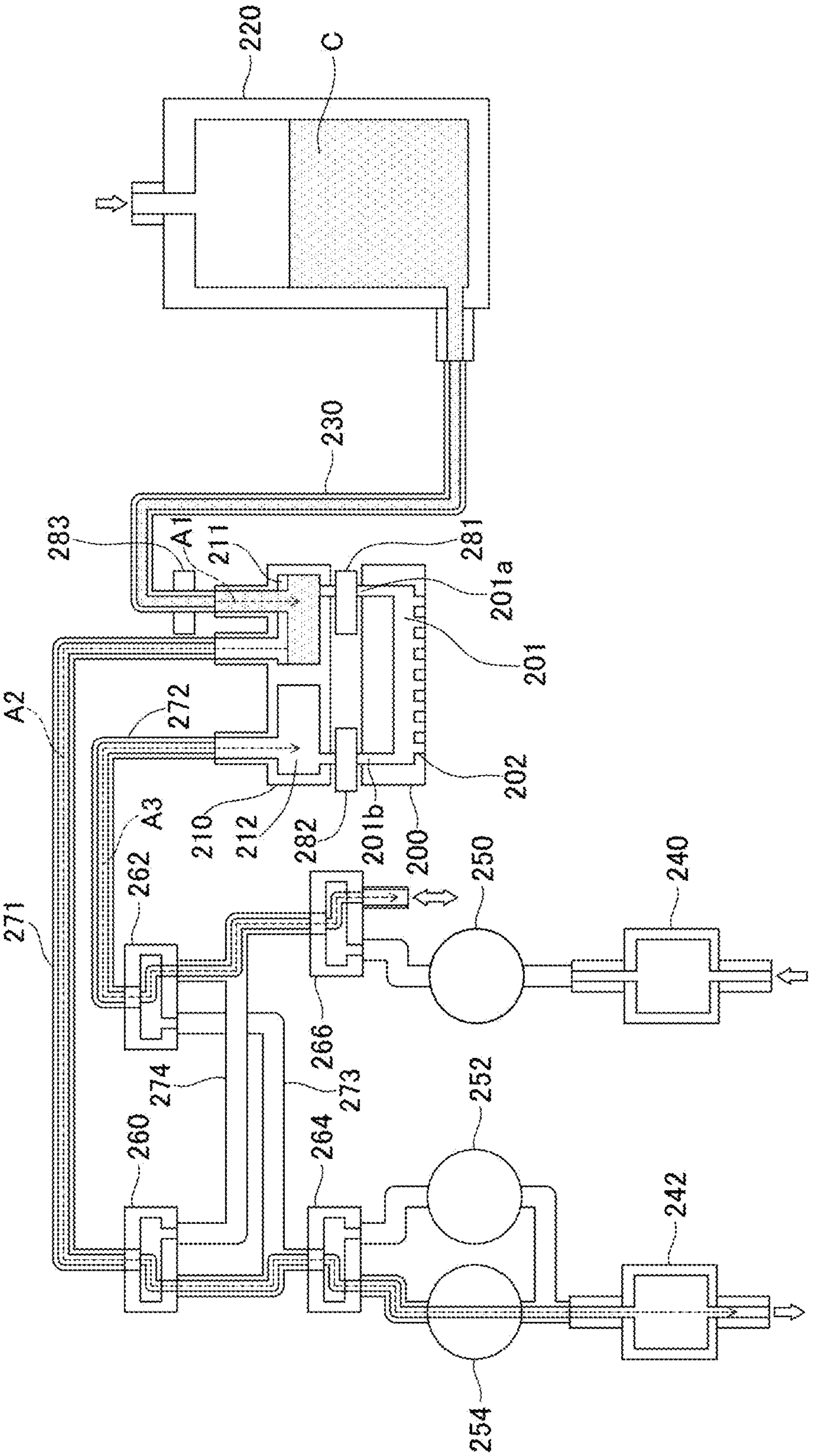
FIG. 4 is a view illustrating a state of supplying ink to a head tank.

FIG. 4 illustrates a state of ink supply process to head tank 210 executed by control device 28, particularly by controller 110. When ink C stored in ink tank 220 is supplied to head tank 210, controller 110 first causes first opening and closing valve 281 to be in a closed state. Next, controller 110 causes third opening and closing valve 283 to be in an open state, and causes first and third switching valves 260 and 264 to supply the high negative pressure generated by vacuum pump 242 and first pressure regulator 254 to first pressure line 271, and to apply the high negative pressure to first chamber 211 of head tank 210. Accordingly, since the high negative pressure is applied to first chamber 211, ink C stored in ink tank 220 flows into first chamber 211 through pipe 230.

In FIG. 4, arrow A1 in a direction from an end portion on first chamber 211 side of pipe 230 toward first chamber 211 indicates a state in which ink C flows into first chamber 211. Arrow A2 in a direction from first chamber 211 toward vacuum pump 242 indicates a state in which the high negative pressure is applied to first chamber 211. Arrow A3 in both directions between second chamber 212 and an external atmospheric pressure indicates a state in which the atmospheric pressure is applied to second chamber 212. However, at this time, second opening and closing valve 282 is caused to be in a closed state, and since second chamber 212 serves no function when supplying ink C to first chamber 211, the positive pressure rather than the atmospheric pressure may be applied to second chamber 212. However, positive pressure pump 240 needs to be operated in order to apply the positive pressure, and since the power is wastefully consumed, the atmospheric pressure is applied.

As described above, in three-dimensional printer 10, when ink C is supplied from ink tank 220 to first chamber 211 of head tank 210, pump 520 (refer to FIG. 8), which is necessary in the conventional configuration, is not necessary, and thus the manufacturing cost of entire three-dimensional printer 10 can be reduced. In addition, since vacuum pump 242 that generates a high negative pressure is an essential configuration of three-dimensional printer 10 in order to perform other functions, as described later with reference to FIGS. 5 to 7, vacuum pump 242 is not provided in three-dimensional printer 10 only for supplying ink C to head tank 210. However, in the present embodiment, first pressure regulator 254 is added in order to generate the high negative pressure, but since the cost of adding first pressure regulator 254 is lower than the cost of adding pump 520, the reduction effect of the manufacturing cost achieved by removing pump 520 is extremely high.

Figure 5:
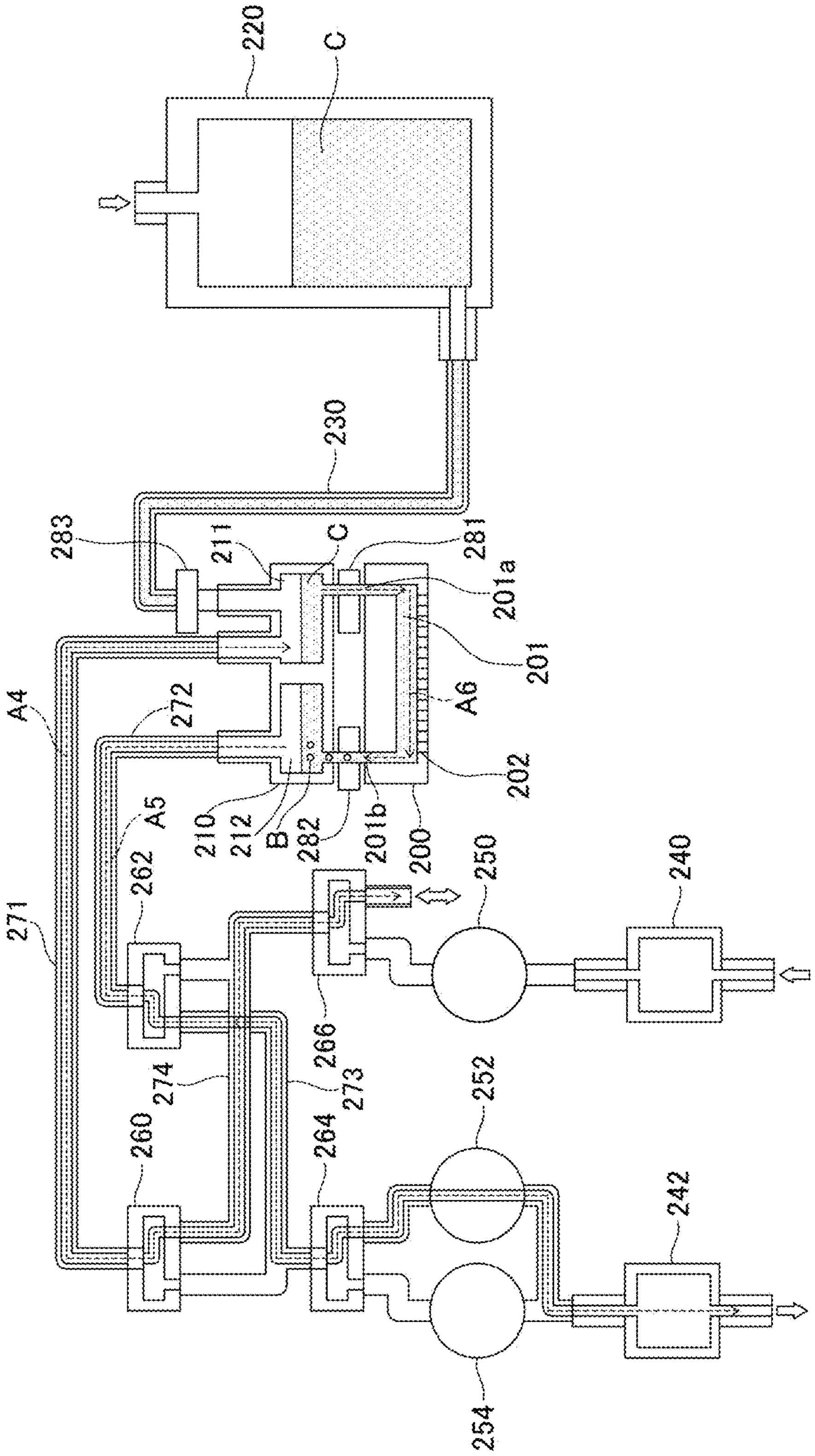
FIG. 5 is a view illustrating a state of supplying ink to an ejection head.

FIG. 5 illustrates a state in which ink C stored in first chamber 211 of head tank 210 is filled into ink flow path 201 in a state in which ink in ink flow path 201 of inkjet head 200 is empty. Before describing the process of filling ink C into ink flow path 201, the process of filling ink C stored in head tank 510 into ink flow path 201 using the conventional configuration illustrated in the above FIG. 8 will be described.

In FIG. 8, when ink C is stored in head tank 510, first, third opening and closing valve 283 is caused to be in a closed state. Next, both first and second opening and closing valves 281 and 282 are caused to be in an open state, and first switching valve 260 is caused to supply the positive pressure generated by positive pressure pump 240 and third pressure regulator 250 to first pressure line 271, and to apply the positive pressure into head tank 510. As a result, the positive pressure is applied to the surface of ink C in head tank 510, and ink C flows into ink flow path 201 from first and second end portions 201*a* and 201*b* of ink flow path 201.

Since ink C flows into ink flow path 201 from a state where there is no ink C, the air in ink flow path 201 is pushed out from nozzle 202 by ink C. However, in the process of being pushed out, some of the air turns into air bubbles, rises in ink C, and remains in ink C. Since the air bubbles cause deterioration in print quality, even if ink flow path 201 is filled with ink C, it is necessary to discharge ink C from nozzle 202 in order to remove the air bubbles from ink flow path 201. Discharged ink C is wasted as it is not used for printing. In this way, with the conventional configuration, when filling ink C into ink flow path 201, ink C was wastefully consumed. In the present embodiment, waste of ink C is prevented even in this case.

In FIG. 5, when ink C is stored in first chamber 211 of head tank 210, controller 110 first causes third opening and closing valve 283 to be in a closed state. Next, controller 110 causes both first and second opening and closing valves 281 and 282 to be in an open state, and causes second and third switching valves 262 and 264 to supply the low negative pressure generated by vacuum pump 242 and second pressure regulator 252 to second pressure line 272, and to apply the low negative pressure into second chamber 212 of head tank 210. Further, controller 110 causes first and fourth switching valves 260 and 266 to supply the atmospheric pressure to first pressure line 271, and to apply the atmospheric pressure to first chamber 211 of head tank 210. In this way, when the negative pressure in second chamber 212 becomes low, ink C stored in first chamber 211 flows from first end portion 201*a* of ink flow path 201 into ink flow path 201. Then, controller 110 continues to maintain a low negative pressure state in second chamber 212 even when ink flow path 201 is filled with ink C, and causes ink C to flow from second end portion 201*b* of ink flow path 201 into second chamber 212. The air in ink flow path 201 is pushed out to second chamber 212 by ink C, but air bubbles B remain in ink C. However, as described above, air bubbles B rise in ink C, and thus burst at the liquid surface of ink C stored in second chamber 212 and disappear from ink C. In this way, in three-dimensional printer 10, ink flow path 201 can be filled with ink C in a state where there are no air bubbles.

In FIG. 5, arrow A4 in both directions between first chamber 211 and the external atmospheric pressure indicates a state in which the atmospheric pressure is applied to first chamber 211. Arrow A5 in a direction from second chamber 212 toward vacuum pump 242 indicates a state in which a low negative pressure is applied to second chamber 211. Further, arrow A6 in a direction from first chamber 211 toward second chamber 212 indicates a state in which ink C flows from first chamber 211 into second chamber 212 through ink flow path 201. When ink C flows from first chamber 211 to second chamber 212 through ink flow path 201, ink C is not supplied into nozzle 202. This is because second chamber 212 is under negative pressure.

In FIG. 5, when filling ink C stored in head tank 510 into ink flow path 201, a low negative pressure is applied to second chamber 212 of head tank 210, but the configuration is not limited thereto, and a high negative pressure may be applied. The difference between applying low negative pressure and applying high negative pressure is whether the speed at which ink C is filled into ink flow path 201 is slow or fast, and no matter which negative pressure is used, ink C is filled into ink flow path 201 without any change.

Figure 6:
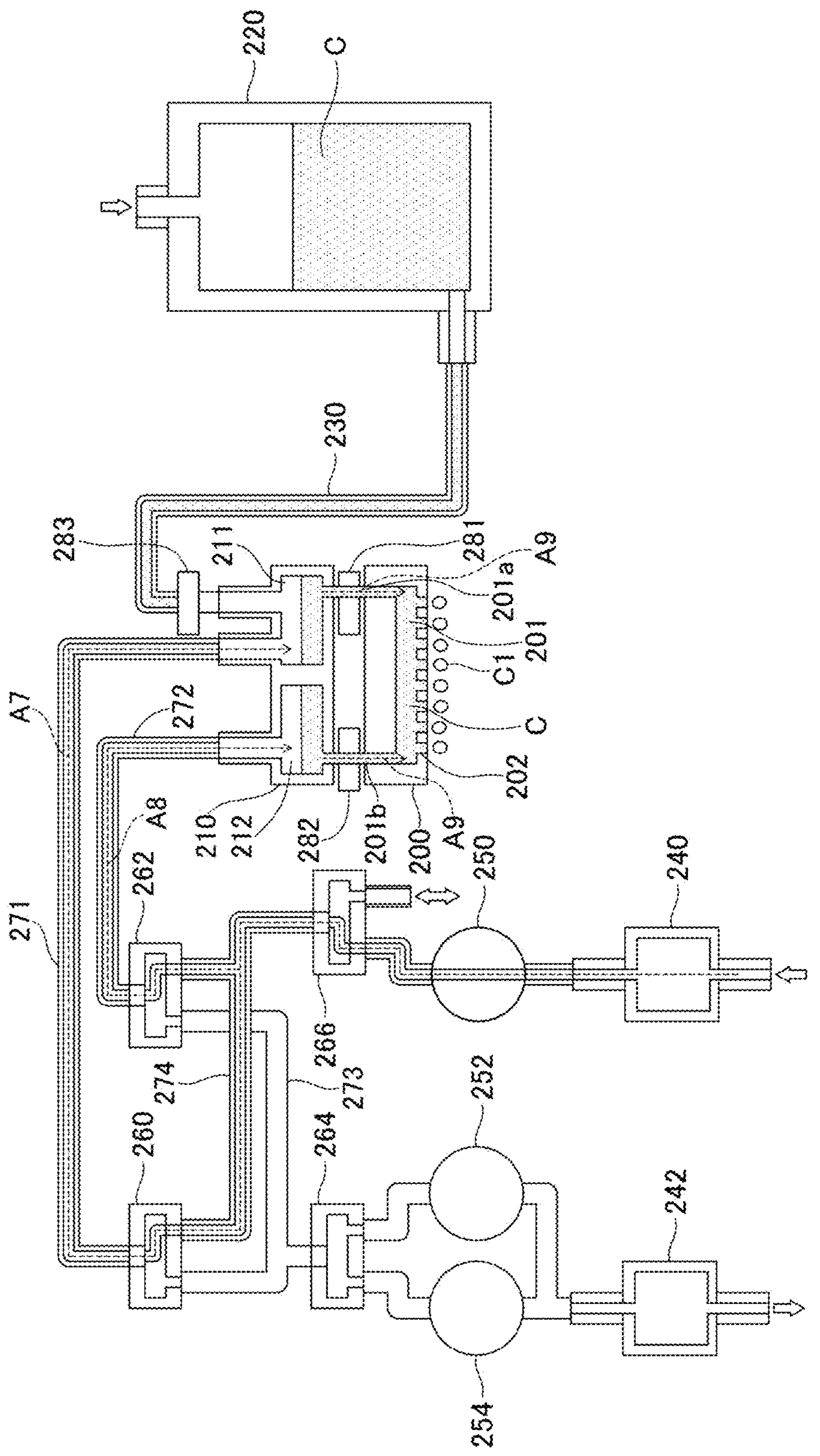
FIG. 6 is a view illustrating a state of supplying ink to nozzles of the ejection head.

FIG. 6 illustrates a state in which ink C is supplied to nozzle 202 after filling ink flow path 201 with ink C in a state where there are no air bubbles. In FIG. 6, first, from the control state of FIG. 5, controller 110 causes second and fourth switching valves 262 and 266 to supply the positive pressure generated by positive pressure pump 240 and third pressure regulator 250 to first pressure line 271, and to apply the positive pressure into first chamber 211 of head tank 210. Next, controller 110 causes first and fourth switching valves 260 and 266 to supply the positive pressure generated by positive pressure pump 240 and third pressure regulator 250 to second pressure line 272, and to apply the positive pressure into second chamber 212 of head tank 210. Accordingly, the positive pressure is applied to the surfaces of ink C in first and second chambers 211 and 212, and ink C is pushed downward, so that ink C in ink flow path 201 is supplied into nozzle 202.

In FIG. 6, arrow A7 in a direction from positive pressure pump 240 toward first chamber 211 indicates a state in which the positive pressure is applied to first chamber 211. Arrow A8 in a direction from positive pressure pump 240 toward second chamber 212 indicates a state in which the positive pressure is applied to second chamber 212. Further, arrow A9 in a direction from each of first and second chambers 211 and 212 toward ink flow path 201 indicates a state in which a downward force is applied to ink C. Circle C1 came out downward from nozzle 202 indicates a state in which nozzle 202 is filled with ink C and some of ink C1 drips from nozzle 202.

Figure 7:
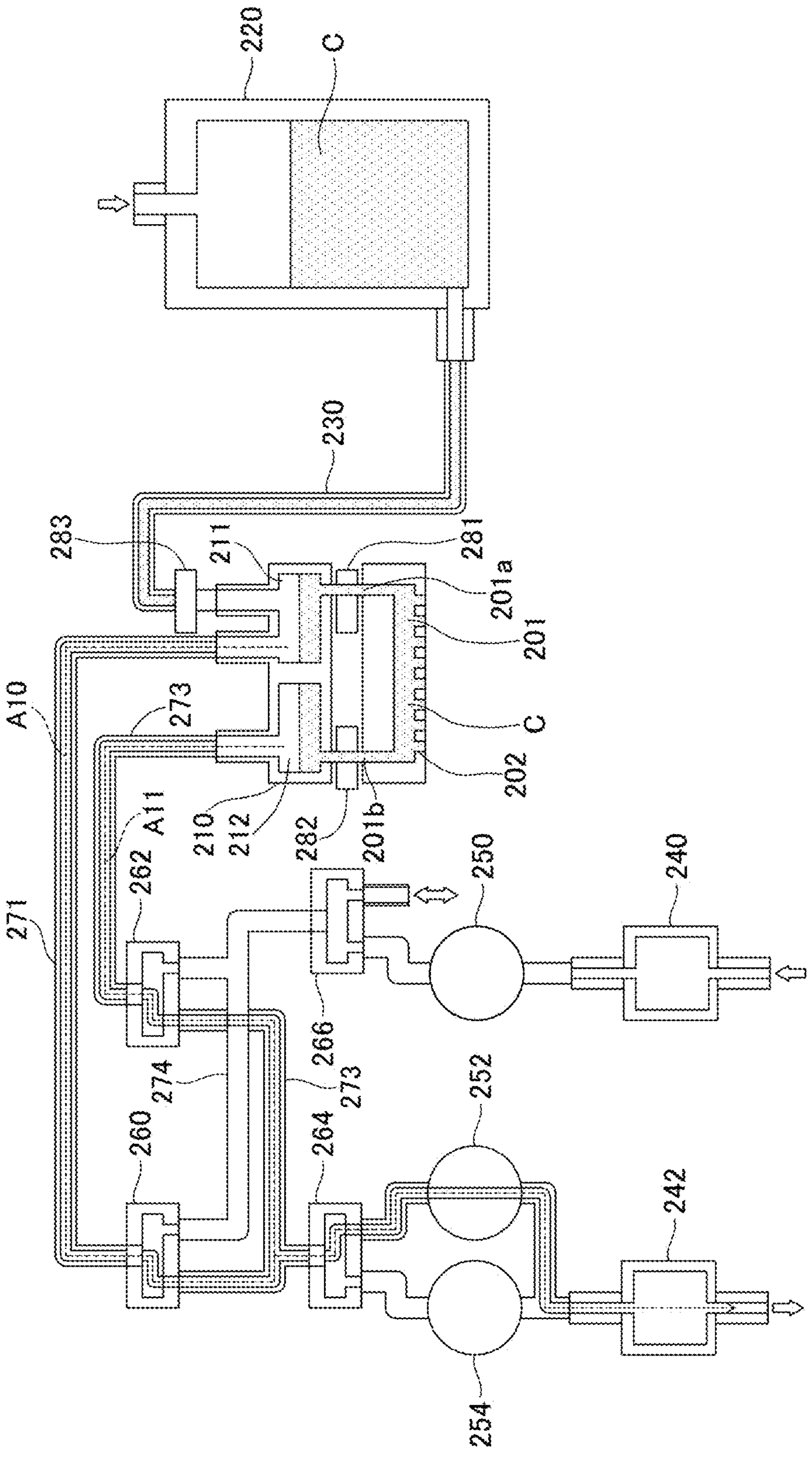
FIG. 7 is a view illustrating a state in which the ejection head is in a printable state.

FIG. 7 illustrates a state of transition from the control state of FIG. 6 to a printable state. In FIG. 7, first, from the control state of FIG. 6, controller 110 causes first and third switching valves 260 and 264 to supply the low negative pressure generated by vacuum pump 242 and second pressure regulator 252 to first pressure line 271, and to apply the low negative pressure into first chamber 211 of head tank 210. Next, controller 110 causes second and third switching valves 262 and 264 to supply the low negative pressure generated by vacuum pump 242 and second pressure regulator 252 to second pressure line 272, and to apply the low negative pressure into second chamber 212 of head tank 210. Accordingly, the low negative pressure is applied to the surfaces of ink C in first and second chambers 211 and 212, and ink C is pulled upward, so that the outer surface of ink C supplied into nozzle 202 becomes a meniscus due to the balance between the upward force applied to ink C and the gravity, and the printable state is achieved.

In FIG. 7, arrow A10 in a direction from first chamber 211 toward vacuum pump 242 indicates a state in which the low negative pressure is applied to first chamber 211. Arrow A11 in a direction from second chamber 212 toward vacuum pump 242 indicates a state in which the low negative pressure is applied to second chamber 212.

As described above, three-dimensional printer 10 of the present embodiment includes inkjet head 200 configured to eject ink, head tank 210 configured to store the ink to be supplied to inkjet head 200, ink tank 220 configured to store the ink to be supplied into head tank 210, pipe 230 configured to connect head tank 210 and ink tank 220, vacuum pump 242 configured to generate a high negative pressure, first pressure line 271 configured to connect head tank 210 and vacuum pump 242, and controller 110 configured to, when supplying the ink from ink tank 220 into head tank 210 via pipe 230, cause the high negative pressure generated by vacuum pump 242 to be applied to head tank 210 via first pressure line 271.

As described above, in three-dimensional printer 10 of the present embodiment, when supplying the ink from ink tank 220 into head tank 210, pump 520, which is necessary in the conventional configuration, is not necessary, and thus the manufacturing cost of entire three-dimensional printer 10 can be reduced.

In the present embodiment, inkjet head 200 is an example of an "ejection head". The high negative pressure is an example of "negative pressure". Vacuum pump 242 is an example of a "negative pressure generating device". Controller 110 is an example of a "control section".

Head tank 210 is divided into first chamber 211 and second chamber 212, first chamber 211 is connected to ink tank 220 via pipe 230, is connected to vacuum pump 242 via first pressure line 271, and is further connected to first end portion 201*a* of ink flow path 201 in inkjet head 200 via first opening and closing valve 281, and controller 110 is configured to, when supplying the ink from ink tank 220 to first chamber 211 in head tank 210, cause first opening and closing valve 281 to be in a closed state, and then cause the high negative pressure to be applied to first chamber 211 of head tank 210 via first pressure line 271.

Accordingly, even in a case where head tank 210 is divided into first chamber 211 and second chamber 212, when supplying the ink from ink tank 220 to first chamber 211 in head tank 210, pump 520, which is necessary in the conventional configuration, is not necessary, and thus the manufacturing cost of entire three-dimensional printer 10 can be reduced. First opening and closing valve 281 is an example of a "first opening and closing device".

Three-dimensional printer 10 further includes first switching valve 260 configured to receive input of the high negative pressure and an atmospheric pressure and switch between the input high negative pressure and the atmospheric pressure to supply the input pressure to first pressure line 271. Second chamber 212 is connected to vacuum pump 242 via second pressure line 272, and is connected to second end portion of ink flow path 201 in inkjet head 200 via second opening and closing valve 282, and third opening and closing valve 283 configured to start or stop supply of the ink from ink tank 220 to first chamber 211 of head tank 210 is provided in pipe 230, and controller 110 is configured to, when supplying the ink from first chamber 211 of head tank 210 into ink flow path 201 of inkjet head 200, cause first switching valve 260 to apply the atmospheric pressure to first chamber 211 in head tank 210, and cause first switching valve 260 to apply the high negative pressure to second chamber 212 of head tank 210 via second pressure line 272.

As a result, it is possible to fill ink flow path 201 with ink in a state where there are no air bubbles without wastefully discharging the ink from inkjet head 200. First switching valve 260 is an example of a "first switching device". Second opening and closing valve 282 is an example of a "second opening and closing device".

Three-dimensional printer 10 further includes positive pressure pump 240 configured to generate a positive pressure, and second switching valve 262 configured to receive input of the high negative pressure and the positive pressure and switch between the input high negative pressure and the input positive pressure to supply the input pressure to second pressure line 272. Inkjet head 200 includes multiple nozzles 202 that eject the ink in ink flow path 201 to an outside, the positive pressure generated by positive pressure pump 240 is input to first switching valve 260 in addition to the high negative pressure and the atmospheric pressure, and controller 110 is configured to, when supplying the ink in ink flow path 201 to the multiple nozzles of inkjet head 200, cause first switching valve 260 to apply the positive pressure to first chamber 211 of head tank 210, and cause second switching valve 262 to apply the positive pressure to second chamber 212 of head tank 210.

As a result, it is possible to supply the ink, filled in ink flow path 201 in a state where there are no air bubbles, to multiple nozzles. Positive pressure pump 240 is an example of a "positive pressure generating device".

Three-dimensional printer 10 further includes second pressure regulator 252 configured to vary a high negative pressure generated by vacuum pump 242 to a low negative pressure. The low negative pressure varied by second pressure regulator 252 is input to first switching valve 260, the low negative pressure varied by second pressure regulator 252 is input to second switching valve 262, and controller 110 is configured to, when putting inkjet head 200 into a printable state, cause first switching valve 260 to apply the low negative pressure to first chamber 211 of head tank 210, and cause second switching valve 262 to apply the low negative pressure to second chamber 212 of head tank 210.

Accordingly, it is possible to print using the ink supplied to the multiple nozzles in a state where there are no air bubbles. The low negative pressure is an example of a "predetermined negative pressure value". Second pressure regulator 252 is an example of a "variation device".

Controller 110 is configured to, when supplying ink from first chamber 211 in head tank 210 into ink flow path 201 of inkjet head 200, cause second switching valve 262 to apply the low negative pressure to second chamber 212 of head tank 210 instead of the high negative pressure.

Accordingly, when suppling ink from first chamber 211 in head tank 210 into ink flow path 201 of inkjet head 200, as either high negative pressure or low negative pressure can be used as the negative pressure applied to second chamber 212 of head tank 210, three-dimensional printer 10 can be designed more flexibly.

The present disclosure is not limited to the embodiment described above, and various modifications can be made without departing from the gist thereof.

(1) In the above embodiment, the metal ink for forming a wiring is adopted as the metal-containing liquid, but various metal-containing liquids can be adopted as long as the metal-containing liquid contains the metal fine particles. Specifically, for example, a conductive paste in which metal fine particles having a micrometer size are dispersed in a solvent can be adopted as the metal-containing liquid.

(2) In the above embodiment, when supplying ink C stored in ink tank 220 to head tank 210, a high negative pressure is applied to first chamber 211, but the configuration is not limited thereto, and a low negative pressure may be applied. This is because the value of the negative pressure applied to first chamber 211 varies depending on the positional relationship between ink tank 220 and head tank 210 or the like, and when ink C is difficult to flow from ink tank 220 to head tank 210, it is necessary to apply a high negative pressure to first chamber 211, whereas when ink C is easy to flow from ink tank 220 to head tank 210, a low negative pressure may be applied.

(3) In the above embodiment, the present disclosure is described as applied to the area around inkjet head 200 of first printing section 72. However, the configuration is not limited thereto, and the area around inkjet head 300 of second printing section 84 need only be configured similarly to the area around inkjet head 200 of first printing section 72. Therefore, the present disclosure may also be applied to the area around inkjet head 300 of second printing section 84.

REFERENCE SIGNS LIST

10: three-dimensional printer, 72: first printing section, 84: second printing section, 110: controller, 201: ink flow path, 201*a*: first end portion, 201*b*: second end portion, 202: nozzle, 211: first chamber, 212: second chamber, 200: inkjet head, 210: head tank, 220: ink tank, 230: pipe, 240: positive pressure pump, 242: vacuum pump, 250: third pressure regulator, 252: second pressure regulator, 254: first pressure regulator, 260: first switching valve, 262: second switching valve, 264: third switching valve, 266: fourth switching valve, 271: first pressure line, 272: second pressure line, 281: first opening and closing valve, 282: second opening and closing valve, 283: third opening and closing valve, C: ink.

The invention claimed is:

1. A three-dimensional printer comprising:

an ejection head configured to eject ink;

a head tank configured to store the ink to be supplied to the ejection head the head tank divided into a first chamber and a second chamber;

an ink tank configured to store the ink to be supplied into the head tank;

a pipe that connects the head tank and the ink tank;

a negative pressure generating device configured to generate a negative pressure;

a positive pressure generating device configured to generate a positive pressure;

a first pressure line that switchably connects the first chamber to the negative pressure generating device and the positive pressure generating device;

a second pressure line that switchably connects the second chamber to the negative pressure generating device and the positive pressure generating device; and a control section configured to, when supplying the ink from the ink tank into the head tank via the pipe, cause the negative pressure generated by the negative pressure generating device to be applied to the head tank via the first pressure line.

2. The three-dimensional printer according to claim 1, wherein the first chamber is connected to the ink tank via the pipe, is connected to the negative pressure generating device via the first pressure line, and is further connected to a first end portion of an ink flow path in the ejection head via a first opening and closing device, and the control section is configured to, when supplying the ink from the ink tank to the first chamber in the head tank, cause the first opening and closing device to be in a closed state, and then cause the negative pressure to be applied to the first chamber of the head tank via the first pressure line.

3. The three-dimensional printer according to claim 2, further comprising:

a first switching device configured to receive input of the negative pressure and an atmospheric pressure and switch between the negative pressure and the atmospheric pressure to supply a first input pressure to the first pressure line, wherein the second chamber is connected to the negative pressure generating device via a second pressure line, and is connected to a second end portion of the ink flow path in the ejection head via a second opening and closing device, a third opening and closing device configured to start or stop supply of the ink from the ink tank to the first chamber of the head tank is provided in the pipe, and the control section is configured to, when supplying the ink from the first chamber in the head tank into the ink flow path of the ejection head, cause the first switching device to apply the atmospheric pressure to the first chamber in the head tank, and cause the negative pressure to be applied to the second chamber of the head tank via the second pressure line.

4. The three-dimensional printer according to claim 3, further comprising:

a second switching device configured to receive input of the negative pressure and the positive pressure and switch between the negative pressure and the positive pressure to supply a second input pressure to the second pressure line, wherein the ejection head includes multiple nozzles configured to eject the ink in the ink flow path to an outside, the positive pressure generated by the positive pressure generating device, as well as the negative pressure and the atmospheric pressure, is input to the first switching device, and the control section is configured to, when supplying the ink in the ink flow path to the multiple nozzles of the ejection head, cause the first switching device to apply the positive pressure to the first chamber of the head tank, and cause the second switching device to apply the positive pressure to the second chamber of the head tank.

5. The three-dimensional printer according to claim 4, further comprising:

a variation device configured to vary a negative pressure generated by the negative pressure generating device to a predetermined negative pressure value, wherein the predetermined negative pressure value varied by the variation device is input to the first switching device, the predetermined negative pressure value varied by the variation device is input to the second switching device, and the control section is configured to, when causing the ejection head to be in a printable state, cause the first switching device to apply the predetermined negative pressure value to the first chamber of the head tank, and cause the second switching device to apply the predetermined negative pressure value to the second chamber of the head tank.

* * * * *